United States Patent
Krogstad (10) Patent No.: US 8,610,778 B2
(45) Date of Patent: Dec. 17, 2013

(54) METHOD AND DEVICE FOR USE IN CALIBRATION OF A PROJECTOR IMAGE DISPLAY TOWARDS A DISPLAY SCREEN, AND A DISPLAY SCREEN FOR SUCH USE

(75) Inventor: Knut Krogstad, Hvalstad (NO)

(73) Assignee: 3 D Perception AS, Asker (NO)

( * ) Notice: Subject to any disclaimer, the term of this patent is extended or adjusted under 35 U.S.C. 154(b) by 979 days.

(21) Appl. No.: 12/280,828

(22) PCT Filed: Feb. 28, 2007

(86) PCT No.: PCT/NO2007/000081
§ 371 (c)(1),
(2), (4) Date: Aug. 27, 2008

(87) PCT Pub. No.: WO2007/100258
PCT Pub. Date: Sep. 7, 2007

(65) Prior Publication Data
US 2009/0091623 A1    Apr. 9, 2009

(30) Foreign Application Priority Data
Feb. 28, 2006  (NO) .................................. 20060984

(51) Int. Cl.
*H04N 17/00*  (2006.01)

(52) U.S. Cl.
USPC ........................................................ 348/189

(58) Field of Classification Search
USPC ....................................... 348/189, 333.1, 745
See application file for complete search history.

(56) References Cited

U.S. PATENT DOCUMENTS

| 4,999,703 | A | 3/1991 | Henderson |
| 5,872,593 | A | 2/1999 | Kawashima |
| 6,219,011 | B1 | 4/2001 | Aloni et al. |
| 6,222,593 | B1 | 4/2001 | Higurashi et al. |
| 6,695,451 | B1 | 2/2004 | Yamasaki et al. |
| 6,888,562 | B2 * | 5/2005 | Rambo et al. ............... 348/14.16 |
| 2001/0022651 | A1 * | 9/2001 | Kubota et al. .................... 353/94 |
| 2002/0180727 | A1 | 12/2002 | Guckenberger et al. |
| 2004/0061838 | A1 * | 4/2004 | Mochizuki et al. ............. 353/69 |
| 2005/0030486 | A1 | 2/2005 | Lee et al. |

FOREIGN PATENT DOCUMENTS

| AU | 625880 | 7/1992 |
| DE | 39113634 | 10/1990 |
| EP | 0703714 | 3/1996 |
| EP | 1065890 | 1/2001 |
| EP | 1385335 A1 | 1/2004 |
| EP | 1457963 A1 | 9/2004 |
| JP | 2005024618 | 1/2005 |

* cited by examiner

Primary Examiner — Timothy J Henn
(74) Attorney, Agent, or Firm — Rodman & Rodman (57) ABSTRACT

A method and a device for use in calibrating a projector image display towards a display screen, wherein the display screen is equipped with a plurality of discrete light detection points on or in the front surface of the screen, or located immediately below the front surface, wherein each light detection point or groups thereof are associated with a light detector, wherein at least one image is projected towards the display screen, and wherein it is determined which image pixel or pixels of the projected image hit the respective detection point on the screen, and/or wherein brightness and/or colours in the projected image are correlated by comparing measurements at the detection points and relevant projector parameters are adjusted correspondingly.

49 Claims, 8 Drawing Sheets

METHOD AND DEVICE FOR USE IN CALIBRATION OF A PROJECTOR IMAGE DISPLAY TOWARDS A DISPLAY SCREEN, AND A DISPLAY SCREEN FOR SUCH USE

The present invention relates to a method and a device for use in calibrating a projector image display towards a display screen. Furthermore, the invention relates to a display screen for displaying an image from at least one projector and for calibrating image geometry.

As an illustration of the prior art, reference will be made to, inter alia, Norwegian Patent 310490 which is related to technology for image processing comprising geometry correction and edge adjustment, so-called edge blending, between images from juxtaposed projectors which project images towards a common display screen. As a further illustration of the prior art, reference is made to, inter alia, U.S. Pat. Nos. 4,974,073, 5,136,390 and 6,115,022. These patents comprise primarily methods and apparatus for processing images in order to obtain seamless, multi-channel projection on a curved screen. These patents are only remotely related to processes for calibrating a system.

As further illustration of the prior art, reference is made to U.S. Pat. No. 6,222,593 which describes a system for coordinating a plurality of projectors so that together they form one image. EP Publications 1065890 and 0703714 describe a system including sensors for optimally adapting a projected image in relation to the display screen. US Patent Publication US 2002/0180727 describes the adaptation of a plurality of projectors to show one image using, inter alia, edge blending.

In recent years, a great deal of research work related to automatic calibration of multi-channel projection systems has been carried out. Commercial systems based on the use of cameras are known from as early as 1985, and a common feature of these solutions is that a digital camera has been used to read a projected image on the screen, so as to compute necessary compensation of the image. In its simplest form, a camera is placed in the observer position, whilst in more advanced forms several cameras are used, optionally also a camera mounted on a motorised arm. Recently, several products for such camera-based calibration have been launched. Some work has been done on research based on directing a digital camera towards the screen in addition to the projectors, so as to measure image position and adjust correction. As an example of such prior art, reference can be made to the web sites http://www.cs.unc.edu/Research/stc/publications/Raskar Vis99.pdf.

http://www.cs.unc.edu/~marc/pubs/RaijICPR2004.pdf http://www.olvmpusamerica.com/visionplex/product presentation.asp A video clip illustrating such a concept is also found on http://www.scalabledisplay.com/02 EEB mpeg1 081004.mpg The known solutions are technically complex, costly and awkward to use.

The object of the present invention is to provide a technical solution that simplifies the calibration work and the equipment required, compared to the method and equipment used today.

The display screen mentioned above is characterised, according to the invention, in that the display screen is equipped with a plurality of discrete light detection points spaced from, on or in the front surface of the screen, or located immediately below the front surface, and where each light detection point or groups thereof are associated with a light detector.

Additional embodiments of the display screen are also disclosed.

The invention will now be described in more detail in relation to non-limiting exemplary embodiments.

The invention is especially useful in those cases where it is desirable to position a plurality of projectors that project composite images towards a curved screen with a view to obtaining a continuous image that covers a larger area, with higher resolution and with a greater light quantity than would have been obtained by projecting from a single projector.

Digital video projector systems are basically made for projecting onto flat canvases or screens. The use of a curved screen, optionally a screen curved in both the longitudinal and the transverse direction, will result in a distorted image and a visible seam when the image is projected on the screen. In the transition between the images there will also be a lighter area where the images from the projectors overlap. In this connection, reference is made to FIG. 6.

To avoid these unwanted effects it is desirable to process the images inside, or before is the image information is delivered to, the projector so that these effects can be neutralised. Today 3D perception AS supplies products that contain: necessary image processing to adjust the image geometry so as to neutralise the distortion on a curved screen; edge blend technology, i.e., so-called edge blending, to reduce the brightness in the transitional area between images from juxtaposed projectors; and compensation for colour and light unevenness in the images.

A primary challenge in the installation of such a system is the adaptation of the image processing to the physical position and set-up of the projectors. For this purpose, 3D perception AS has developed software which enables a user to digitally model screen geometry and projector position in the room, and to define what type of images are to be shown and what the result should look like from a given position in the room.

The digital model of the projection geometry is used by the software to compute necessary compensation for geometric distortion, edge blending, and compensation for brightness. Compensation data is transferred to the projector or image processor, which applies the compensation to the images before they are displayed.

Since there will always be finite tolerances in how a projector is constructed, and in the exact position in which it is placed, the computed compensation will not be of a sufficient standard to obtain a completely seamless image. A small displacement in, e.g., optical components in the projector, or in the orientation of the projector will result in a large displacement in the image on the screen, with the result that the image is not perceived as continuous.

A further calibration must therefore be made, which in today's products from 3D perception AS is carried out as a manual post-calibration based on visual inspection of the image, and a software-assisted shifting of parts of the image to compensate for such errors.

Figure 1:
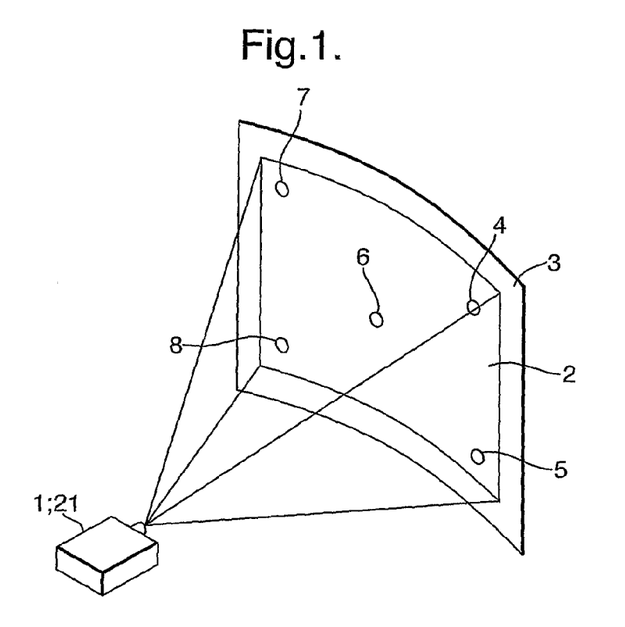
FIG. 1 shows a projector projecting an image towards a display screen, and where detection points are located on the screen.

FIG. 1 shows a projector 1; 21 which projects an image 2 or a sequence of images towards a display screen 3. The display screen is in addition equipped with a plurality of discrete light detection points 4, 5, 6, 7, 8 on or in the front surface of the screen, or located immediately below the front surface, each light detection point or groups thereof being associated with a light detector.

Figure 5A:
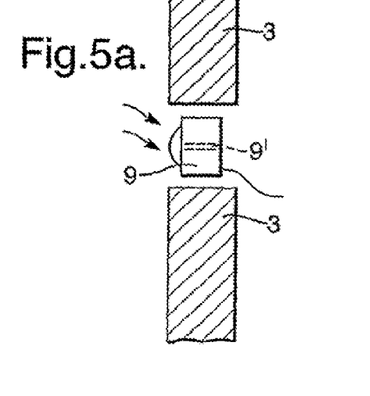
FIGS. 5a-5j show alternative embodiments of detector points in connection with a display screen.

FIG. 5a shows that the light detection points 4-8 are associated with a respective, discrete light sensor 9 which is positioned almost flush with the front surface of the screen 3. The light detection point may optionally also contain a light emitter 9'.

Figure 5B:
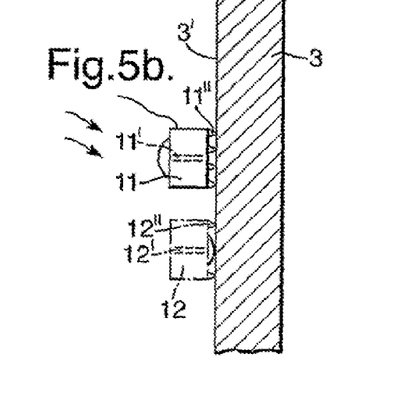
Figure 5C:
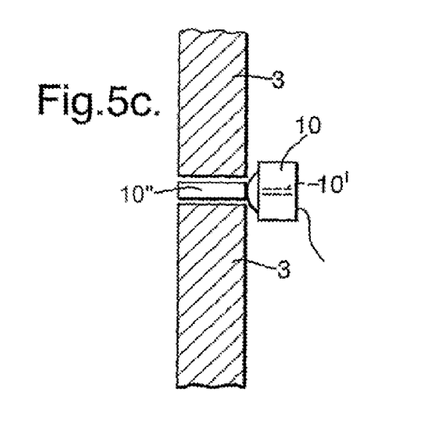

FIG. 5c shows that the detection point, optionally all the detection points or groups of detection points are associated with a light sensor 10 via light guide 10". Also in this case, a light emitter 10' can, if desired, be integrated in connection with the sensor 10.

FIG. 5b shows that the detection point can be placed on the front surface 3' of the screen 3, i.e., that the sensor, indicated by the reference numeral 11 in this figure, is, for example, attached with an adhesive 11" to the front surface 3'. The reference numeral 11' indicates an optional light emitter. It is also conceivable that such light detection points are attachable to the front of the display screen individually or in groups. This may be done by using fixing devices (not shown) that can be hooked onto the screen by means of mounting brackets, suspended using thread, wire or connecting cable, or that very fine tacks are used that can be pressed into the screen surface 3'.

Figure 5D:
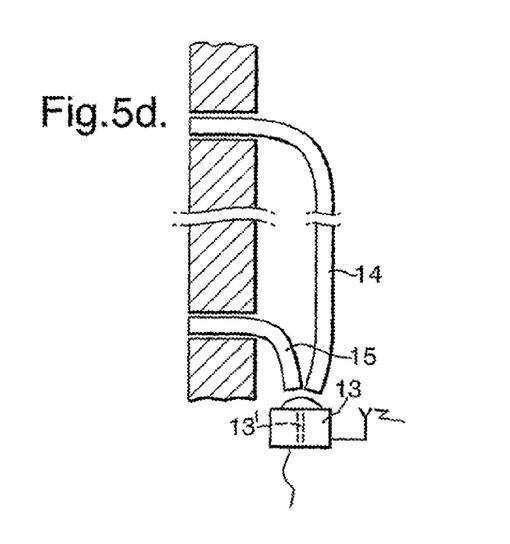

FIG. 5d shows that all the detection points or groups of detection points, for example, the points 4, 5 are associated with a common light sensor 13 via optical fibres 14, 15. An optional light emitter is indicated by 13'. One advantage of this solution is that only one single light sensor is required, and furthermore only one single light emitter, if such is desired.

Figure 5E:
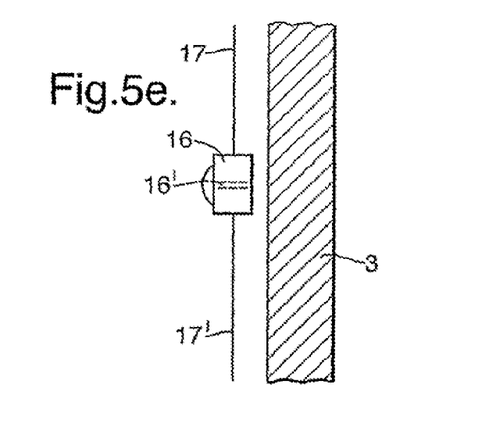

FIG. 5e indicates the possibility of locating at least one of the detection points 4-8 in the form of a light sensor 16 placed on the front of the display screen and at a distance therefrom. This distance does not necessarily need to be great, but it will be understood that any measurement errors can be compensated with respect to the distance of the light sensor from the screen surface. An optional light emitter is indicated by the reference numeral 16' in this figure. The light sensor 16/light emitter 16' may either be mounted in a wired bar (not shown) or be mounted using signal wires 17, 17'.

FIGS. 5f-5j are a variant of what has been shown in FIGS. 5a-5e. In the solutions shown in FIGS. 5f-5j, the front of the display screen is provided with a cover layer 3" which is partially translucent.

Figure 5F:
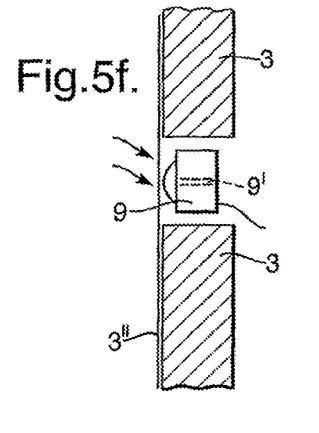

As shown in FIG. 5f, the light sensor 9 and the light emitter 9' can thus be positioned in the screen structure so that they are hidden under the cover layer when the screen is viewed from the front, whilst it is ensured that light respectively to and from the light sensor 9 and the emitter 9' passes through the cover layer 3".

Figure 5G:
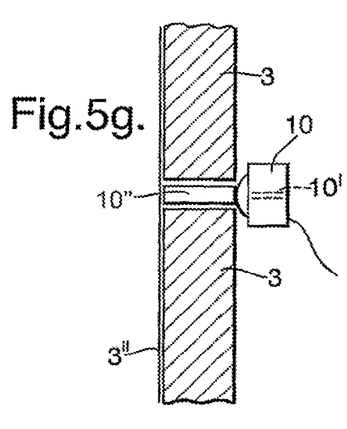
Figure 5H:
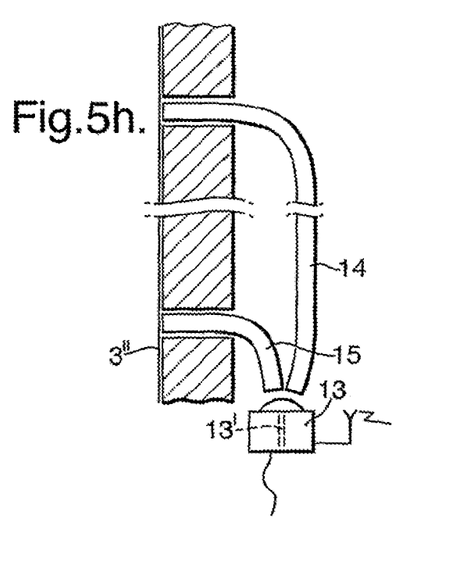

The same considerations apply to that shown in FIGS. 5g and 5h.

FIG. 5g shows that the light guide 10" is located underneath the cover layer 3" in the screen structure 3, whilst it is ensured that light respectively to and from the sensor 10 and the emitter 10' passes through the cover layer 3" and via the light guide 10". The same happens as shown in FIG. 5h, where one light detector 13 and light emitter 13' is used for at least two optical fibres 14, 15. In this instance, the optical fibres are terminated underneath the cover layer 3".

Figure 5I:
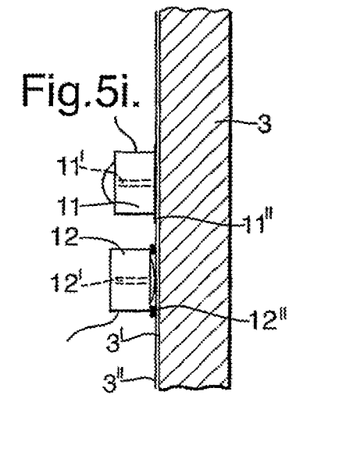

FIG. 5i shows that the detection point can be placed on the front surface 3' of the screen 3, but where the front surface in this case optionally has a cover layer 3". Such a cover layer 3" is, as mentioned, appropriate, for example, with the solutions shown, for instance, in FIGS. 5f-5h. In this case, the sensor, also designated by the reference numeral 11 here, can be attached, for example with adhesive 11", to the cover layer 3" on the front surface 3' of the display screen 3. The reference numeral 11' indicates, as previously mentioned, an optional light emitter. If the display screen is of such a structure that image projection expediently takes place towards the rear of the screen, which should be regarded as a realistic alternative, a light sensor 12, optionally with a light emitter 12', may be used that is fastened to the cover layer 3" and is oriented towards the cover layer 3" and thus towards the rear of the display screen 3. This light sensor 12/light emitter 12' is expediently secured to the cover layer in a detachable manner using an adhesive 12". It is also conceivable that such light detection points could be attachable to the front of the display screen individually or in groups. This may optionally be done using fixing devices (not shown) that can be hooked on the screen by means of mounting brackets, suspended using thread, wire or connecting cable, or that very fine tacks are used that can be pressed into the surface 3' of the screen and/or the cover layer 3".

Figure 5J:
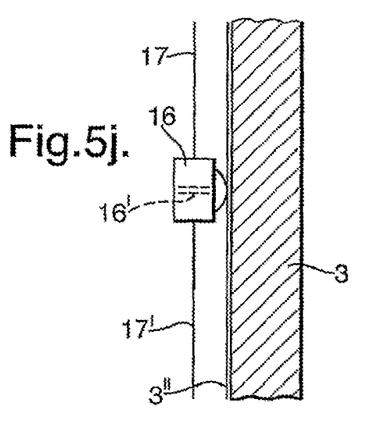

FIG. 5j is a variant of the solution shown for the light sensor 12 and the light emitter 12' in FIG. 5i and an alternative solution to that shown in FIG. 5e. Here, the possibility of locating at least one of the detection points 4-8 in the form of light sensor 16 placed on the front of the display screen and at a distance therefrom is indicated. This distance does not necessarily need to be great, but it will be understood that any measurement errors can be compensated with respect to the distance of the light sensor from the screen surface. An optional light emitter has been indicated by the reference numeral 16' in this figure. The light sensor 161 light emitter 16' can either be mounted in a wired bar (not shown) or be mounted using signal wires 17, 17'. The light sensor 161 light emitter 16' here is oriented towards the cover layer 3" and thus towards the back of the screen 3 for when image projection against the display screen 3 is done from the rear.

The cover layer 3" which is shown in FIGS. 5f-5j may, for example, consist of at least one layer of paint, a sheet material, a foil or film or other suitable cover layer which has the property of being partially translucent. This means for that shown in FIGS. 5*i* and 5*j*, with respect to the light sensor 12'/light emitter 12' and light sensor 16/light emitter 16", that the material in the screen structure 3 also here should be wholly or partially translucent. If the screen structure in this case is partially translucent, for example so that the front of the screen appears matt, it may optionally be possible to dispense with the cover layer 3", in which case the light sensor 12/light emitter 12' is secured directly on the front surface 3' as indicated in FIG. 5*c*, by using, for example, adhesive 12". For the solution shown in FIG. 5*e*, the same approach would entail turning the light sensor 16/light emitter 16' 180°.

As shown in FIGS. 5*a*-5*j*, such light measurement can thus be carried out either through discrete light sensors, for example, phototransistors, mounted in holes in the screen, mounted behind the screen, light being guided to the sensor via an optical fibre, mounted directly on the screen surface, mounted in holes in the screen in order via optical fibres to guide light from the detection point to a central sensor or sensor group, or mounted at a distance from the front surface of the screen.

To obtain a good result, it is important that the physical position of each light detection point is known, so that light response in a known limited area or point can be measured. Any small deviations in the position of the light detection points will ultimately result in a corresponding deviation in image position, although this can probably be averaged out over a larger area.

When a projection system is in normal operation, it is desirable that the light detection points with associated light sensors on or in the screen are visible to the least possible extent. The right choice of sensor at the relevant detection point will make it realistic to be able to paint over the screen with a thin layer of paint without the sensor function being significantly affected, but so that the detection points/the sensors are almost invisible.

A system with sensors mounted in the screen can, as mentioned, also conceivably be supplemented by light sources or light emitters 9', 10', 11', 12', 13', 16' as an additional reference for the user, e.g., in the form of light emitting diodes which mark the position of the horizon in a simulator projection theatre, or additional markings which indicate a grid or the like for facilitating the rough adjustment of projectors, for example, also after a maintenance operation. Furthermore, additional markings could be used for verifying the end result.

Figure 2A:
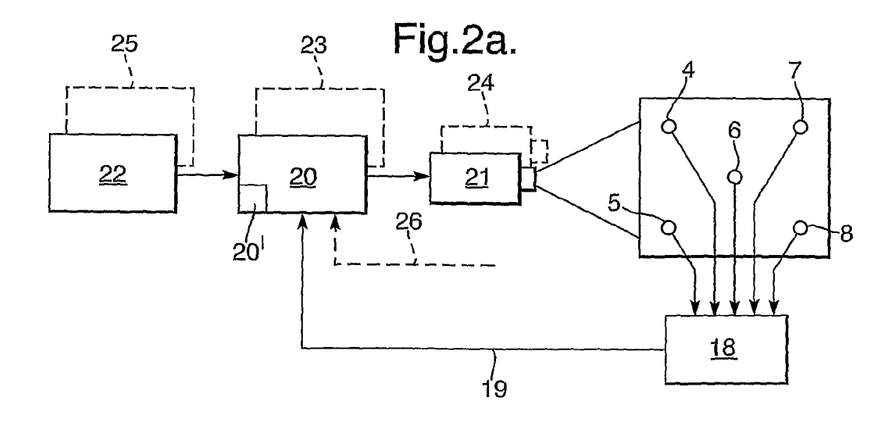
FIG. 2a is a block diagram showing an example of a circuit set-up for implementation of the invention.

As shown in FIG. 2*a*, the light sensors selected from the type 9-13 and 16 and which are associated with the detection points 4-8, will be connected to a data collecting unit 18 which via cable 19 is connected to a processor 20 which, inter alia, will serve as an image processing unit. Communication from the sensors to the processor can take place by a fixed connection or wirelessly. It is also possible that the processor 20 is constituted of or is a part of the projector's own processor. In FIG. 2*a*, the reference numeral 22 indicates an image source.

The object of the light detection points is primarily to be able to determine which image pixel or pixels of the projected image 2 hit the respective detection point 4-8 on the screen. Although as an example just five detection points 4-8 are shown, it will be understood that fewer or more detection points are possible, without thereby departing from the inventive idea, and that these points may be positioned differently than in FIGS. 2*a*-2*b*, 6, 8 and 9.

Furthermore, it is possible that just one of the solutions shown in FIGS. 5*a*-5*d* may be used, optionally that two or more solutions are used simultaneously.

The use of the light detection points when projecting at least one image towards the display screen also permits correlation of brightness and/or colours in the projected image by comparing measurements at the detection points, thereby making it possible to adjust relevant projector parameters correspondingly in the projector 21 or in the processor 20. For this purpose, the processor will contain a correlator 20'.

Figure 6:
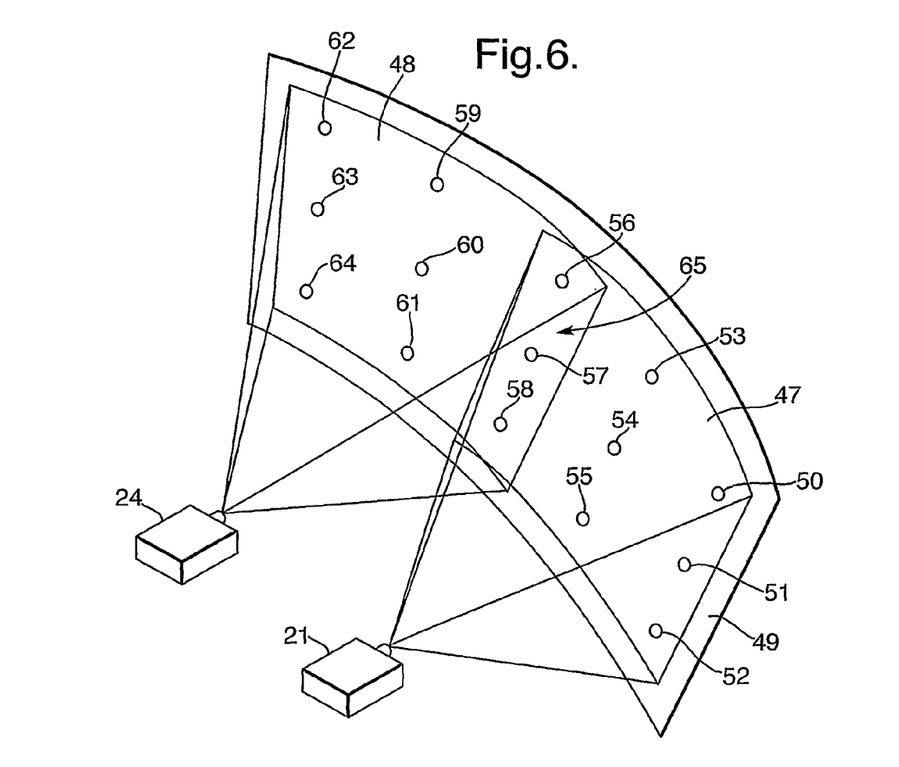
FIG. 6 shows the display of partly overlapping images on a display screen using at least two projectors.

FIG. 2*a* indicates in broken lines supplementary processor 23, projector 24 and image source 25, these being conceivable if, for example, two partly overlapping images are to be displayed, as illustrated in FIG. 6. However, it is possible that in some cases the processor 20 and the source 22 may be the same if two projectors are used. Additional signals from other light detection points are delivered to such a processor 20 and/or 23 via, for example, cable 26. This will be explained in some more detail in connection with FIG. 6.

Figure 2B:
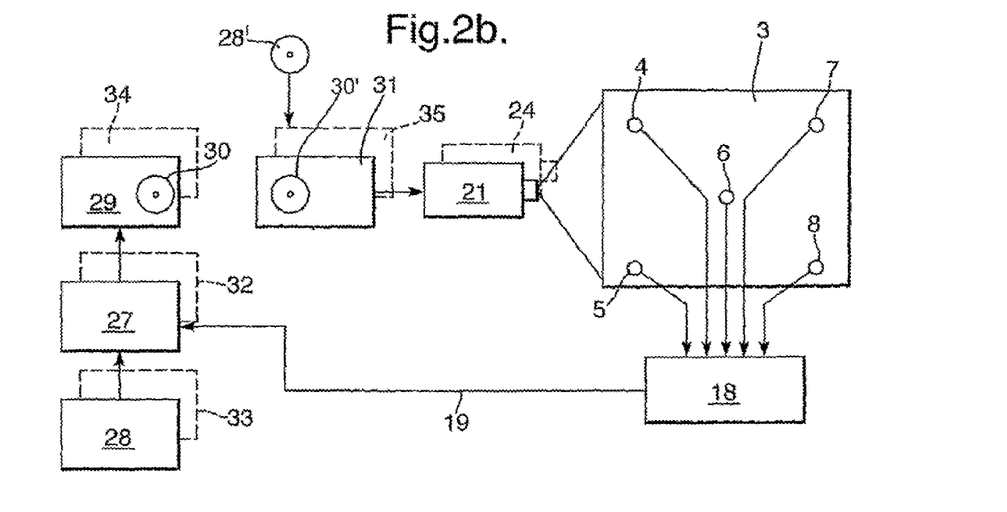
FIG. 2b is a block diagram showing an example of a circuit set-up for implementation of image processing before storing to a storage medium.

In FIG. 2*b* it is indicated that the light sensors associated with the detection points 4-8 are connected to a data collecting unit 18 which via cable 19 is connected to an image processing unit 27. An image source 28 is present, as is a storage medium 28' with the same image data or with a sequence of test images. The storage medium 28' is located in a player 31 which delivers image data directly to the projector 21. Measurement errors that are detected by the detection points 4-8 pass to the unit 18 which via the connection 19 delivers detection data to a signal processing unit 27, which on the basis of these data establishes correction data. An image source 28 is adapted to deliver images to the unit 27, thereby enabling the images to be corrected in the unit 27 to the form in which they will later be displayed from the projector 21 when the storage medium 28' has been removed and replaced by a new, corrected storage medium 30'. The output from the unit 27 is delivered to a video recorder 29 which is adapted to record on a storage medium 30, for example, a CD-ROM or the like, the signal-processed video that comes from the source 28. Said storage medium with corrected video, now designated medium 30', can then be put in the player 31 which thus delivers a corrected and adjusted video to the projector 21, a corrected image thus being displayed on the screen without the necessity of any additional corrections. This is a solution which is especially valuable for those cases where the alignment between projector and screen remains constantly unchanged, as is typical in a projection theatre. If there is a farther projector 23, it may be appropriate to provide a further signal processing unit 32, source 33, recorder 34 and player 35. As shown for FIG. 2*a*, communication from the sensors to the signal processing unit 27; 32 may take place by a fixed connection or wirelessly. It is also conceivable that the player 31; 35 is not necessarily separate, but in integrated in the projector 21; 24.

Figure 2C:
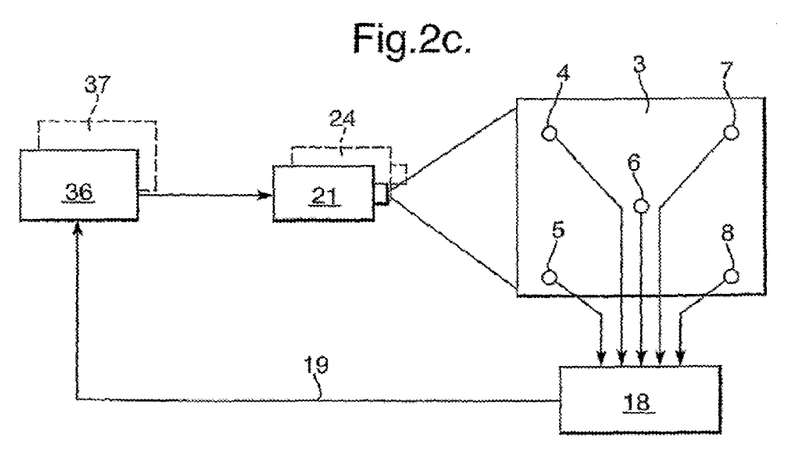
FIG. 2c is a block diagram showing an example of a circuit set-up for implementation of feedback to one or more sources.

As shown in FIG. 2*c*, the light sensors selected from the type 9-13 and 16 and which are associated with the detection points 4-8 will be connected to a data collecting unit 18 which via a cable 19 is connected to a source 36. This feedback to one or more sources such as the sources 36, 37 will be able to function if the source or sources are, for example, a 3D graphic generator or generators. If there are several projectors, such as projectors 21; 24, it will be necessary to have a corresponding number of sources, such as sources 36; 37. Several types of graphic generators will be capable of compensating wholly or partly for computed measurement deviations, either by adjusting the computed field of view, by correcting for screen geometry or by adjusting edge blending and/or colours. A commonly available 3D graphic generator will be able to serve as image processing unit and compensate for any orientation of the projector towards a flat screen. This can be done by correcting the computed field of view, so-called view frustum. More advanced 3D graphic generators could be used for non-linear adaptation of image geometry towards curved screens, i.e., by introducing image processing into the image generator shown in connection with, for example, FIGS. 2a and 2b and as otherwise described below. Communication from the sensors to the source or sources 36; 37 may take place by fixed connection or wirelessly.

The images that are successively projected on the screen are advantageously wholly or partly different or changing images.

Figure 3A:
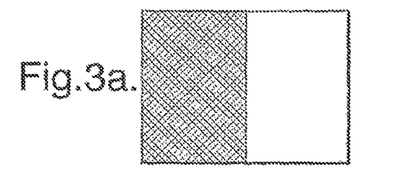
FIGS. 3a-3j show non-limiting examples of test images that can be used for calibration.
Figure 3B:
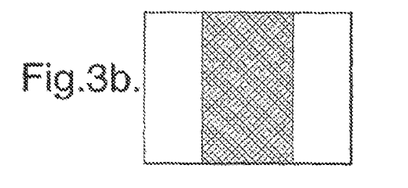
Figure 3C:
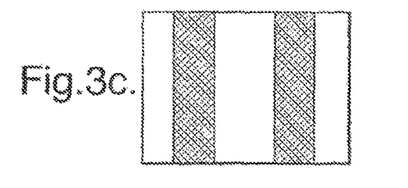
Figure 3D:
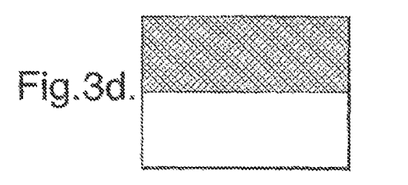
Figure 3E:
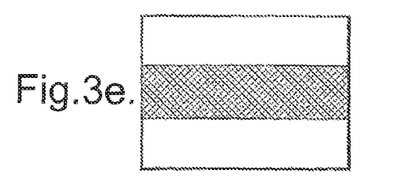
Figure 3F:
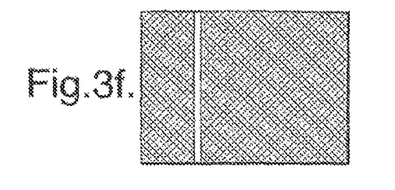
Figure 3G:
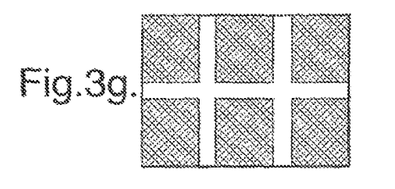
Figure 3H:
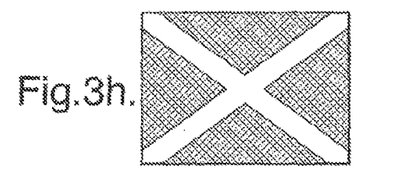
Figure 3I:
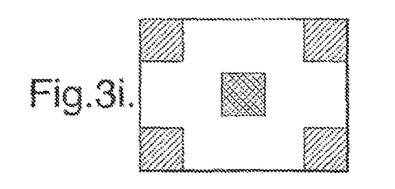
Figure 3J:
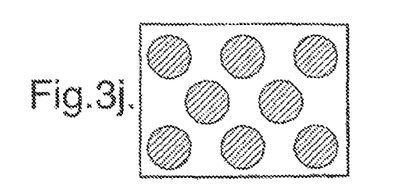

It is also quite conceivable that the image or images used have a typical test image configuration. Rough examples of such test images partly to find where light detection points are in relation to the projected image 2 are shown in FIGS. 3a-3j. In the first instance, an attempt is made to find what area of the image the detector points are in by alternating between different images, and by such alternation gradually obtaining determination of the coordinates in the projected test image for the light detection point in question. As can be seen from FIGS. 3a-3j, the projected test image appears as a sectioned or divided image on the display screen, and the position of respective detection points is thus defined with relation to an x, y position or a group of x, y positions in the sectioned image. In this connection, it is conceivable that the test image pattern changes from one test image to the next, like, for example, the changes indicated in FIG. 3a to 3e inclusive. In FIG. 3f, it will be seen that there is a vertical stripe in the image and which in a subsequent image could, for example, have shifted to the left or to the right. It is of course also possible that the exemplary respective patterns in FIGS. 3g-3j could change individually to more easily determine the correlation between test image pixels and detection point.

To perform measurement of an image, a set of test images can be used that illuminate the screen and the sensors associated with light detection points 4-8, e.g., with white lines on a black background that are projected on different points in the projectors' image surface, in order to then measure when such a line hits each light detection point. By finding one hitting point in the horizontal direction and one in the vertical direction, it will be possible to determine the position of each light detection point seen from the projector's viewpoint, or put another way, decide which picture element in the projector hits the light detection point.

Figure 7A:
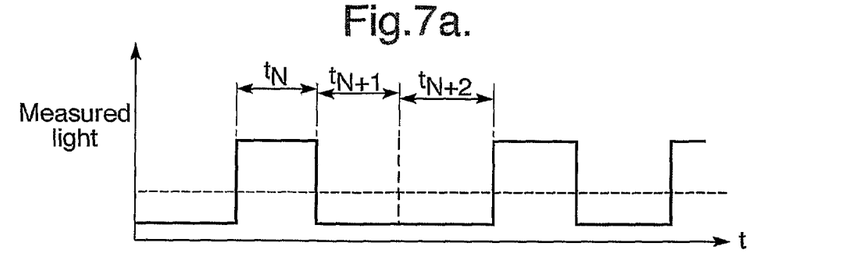
FIG. 7a is a schematic illustration of measured light as a function of time.

As an alternative to using horizontal and vertical lines, it is possible to use a pattern of coding, for example binary coding, of areas of the screen, so as to determine the position of many sensors with few measurements. A person of skill in the art will understand that if at least two successive image measurements are used, this will cause the image pixel or pixels detected in a respective light detection point to define respective image pixel coding for the determined image pixel position in the projected image, which means that the position of each detection point is associated with at least one pixel address. Such coding may appear as a binary code. This is illustrated in more detail in connection with FIG. 7a which indicates measured light at a detection point as a function of time. In the time interval indicated by $t_N$, light is measured from image pixel in image N. In the time interval indicated by $t_{N+1}$, light is measured from image N+1, etc. When the light measurement is determined to be above a set threshold, as indicated by the horizontal broken line, it can be viewed as a binary "1", whereas when it is below the threshold it can be viewed as a binary "0". The sequence of measurements may thus be regarded as a binary pattern or a binary code, which can be used to identify a position in the projected image.

The measurements of the position of the light detection points will for each such point within a projector's coverage, give a pair of coordinates (x, y) in the projector's image coordinates which indicate what pixel is closest to the centre of the given light detection point.

As an alternative or supplement to digital coding, the coding may be analogue and related to analogue parameters such as brightness or colour in a detected image pixel. When performing analogue measurement, a test image can, for example, be shown with a colour gradient. This can, for example, take place at gradually varying intensity from black in one image edge to white in the opposite image edge. In such an image, the position can be measured by measuring the brightness or colour that hits the detection point. By using several successive test images with gradients in different directions, or by using different colours to code different gradients, the position can be determined in x, y.

Figure 7B:
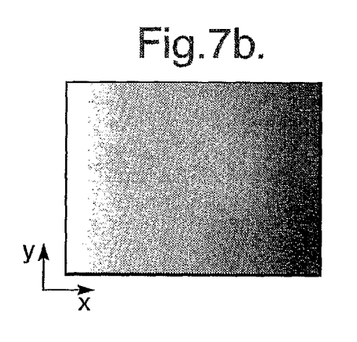
FIGS. 7b and 7d are rough schematic illustrations of the gradual colour transition from white to black.
Figure 7C:
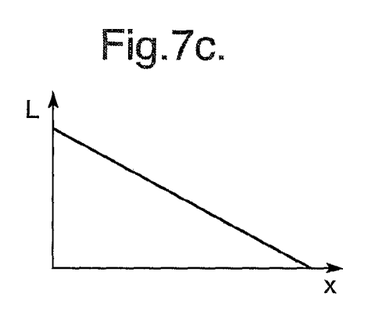
FIGS. 7c and 7e are a graphical presentation of brightness L as a function of respectively x with reference to FIG. 7b and of y with reference to FIG. 7d.
Figure 7D:
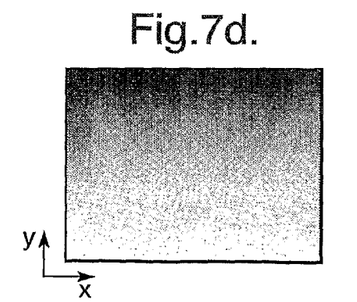
Figure 7E:
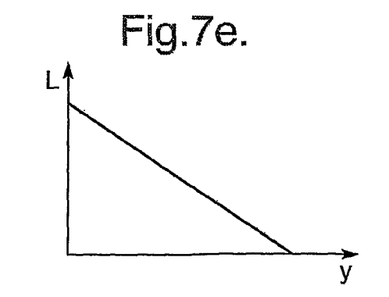

In FIG. 7b, with associated brightness diagram in FIG. 7c, and as an alternative in FIG. 7d with associated brightness diagram in FIG. 7e, there is a rough outline of how gradual transition from white through the colour scale to black may appear as a test image. By using several test images with a colour gradient as shown in FIGS. 7b and 7d, it is possible to determine the position of a measuring point by looking at the analogue light quantity that is detected at the respective light detection point. By using combinations of gradients, for example, from right to left, followed by a gradient from left to right, it is possible to compensate for measurement inaccuracies in analogue measurement. As an alternative or supplement, it is also possible to perform a measurement of image content in ordinary projected images, i.e., non-typical test images. In this case, the choice is made to correlate measured analogue values with the signal level in different parts of the image in question at given points in time, so as to be able to determine the position of each measuring point during normal operation of the system. With sufficient variation in the images over time, it is thus possible to determine the position of the measuring point as the point in the image which gives best correlation between signal level and measured light quantity.

Figure 4A:
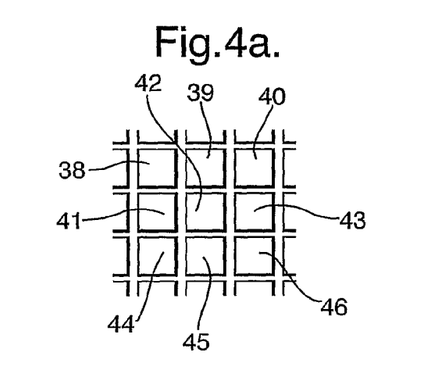
FIG. 4a shows an enlargement of a plurality of image pixels in a projected image.
Figure 4B:
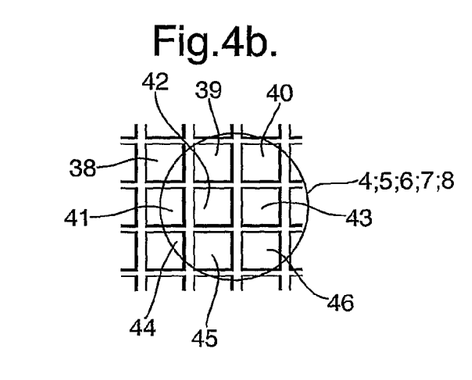
FIG. 4b shows an indication of a detector point which detects several such image pixels simultaneously.

FIG. 4a shows an enlarged section of a projected image where pixels designated 38-46 are shown. FIG. 4b shows that one detector point 4; 5; 6; 7; 8 captures the pixels 39, 42, 43 and 45 completely, whilst the pixels 38, 40, 41, 44 and 46 are only partly captured. In such a case where the detection point is caused to be hit wholly or partly by two or more image pixels, a centre of mass computation of detected image pixels must be carried out to compute the position (centre) of the detection point in relation to the image pixels' hit in the detection points of the display screen. This centre of mass computation may, for example, be made on the basis of the brightness of the image pixels and/or their colour or overall colour. The detection points can also be used to control the focussing of the projectors. If more pixels give a "hit" towards a detection point than expected, this may be due to the projector not being correctly focussed. This information can be used in its simplest form to give an operator a warning that the lens should be focussed, or in a more advanced system it can give feedback to an autofocus mechanism which adjusts motorised focus in the projector 1; 21; 24 based on these measurements.

The fact that a light detection point is hit by two or more image pixels at the same time, as indicated in FIG. 4b, may be due to either the image resolution (number of pixels per surface unit), or that the projected image is not completely focussed, or that the area of the light detection point is so large that it will cover several image pixels.

If image pixels are only evaluated directly on the basis of a digital coding principle, there is a risk that the measurement accuracy will not be of a sufficient standard if the detection point has such a dimension that it captures several image pixels. In such a case, analogue weighting of several successive measurements at the detection point, optionally in addition to digital coding, could give better measurement data.

In a simple system with a physically small detection point, the accuracy in finding (x, y) will be equal to the pixel resolution (i.e., (x, y) is given in integer pixel coordinates). If the detection point is given a larger coverage area, as indicated in FIG. 4b, more pixels will be able to stimulate the sensor that is integrated in the detection point. This can then be used to enhance the precision of the position determination. Through the suggested said centre of mass computation of the pixels that "hit" the sensor, optionally by taking into account the light level and/or colour level detected for each pixel, (x, y) can be computed with greater precision than integer pixels.

Where, for example, laser projectors or CRT (cathode ray tube) projectors are used, it is possible by measuring brightness to adjust for, for example, convergence between the primary colours red, blue and green, or other primary colours. Such adjustment by correlation of the actual colours that are projected from a projector is essential where parameters and/or image processing must be carried to get the different sub-images to hit the same point on the display screen.

According to a possible preferred solution, according to the invention, the object is with the aid of the processor 18 to compute the expected position of the individual detection points based on parameters of a theoretical model which at least include the x, y, z parameters of the projector and the x, y or x, y, z parameters of the detection points in relation to the position and orientation of the projector. The processor will subsequently try to find the position of the projector in relation to the theoretical model based on the measured position of the detection points, after which the processor will cause deviations in the computation to be minimised in order to define the position of the projector in relation to the individual detection points.

Here, it is also possible to conceive of the construction of a catalogue of measurement deviations associated with each detection point, and that a correction parameter is introduced which is specific to each detection point so as to cause shifting of a desired picture element or image pixel to as close to said detection point as possible.

The principle, in addition to measured (x, y) coordinate pairs, for computing an expected position of each light detection point and associated sensor on the basis of said theoretical model of the projector position in relation to screen and sensors, will now be described in more detail. Based on this explanation, a person of skill in the art will understand how this may be done in practice.

Today 3D perception AS uses a three-dimensional model of the projection theatre which includes the position of projectors in six degrees of freedom, and screen geometry. In addition, the projector may have variable setting of zoom, focus and lens change. More advanced parameters, as for instance pre-measured or computed lens distortion, effect of mirrors or the like may also be used in addition.

On the basis of the model's theoretical values for these parameters, it is possible to compute an estimate of where each sensor will be in the image coordinate system of the projector. These estimates can then be compared with the measured (x, y) values.

By parameterising the computation of theoretically computed $(\tilde{x}_i, \tilde{y}_i)$ as a function of the model's parameters to a function of each detection point ("sensor") (i):

$$(\tilde{x}_i, \tilde{y}_i) = f(x_{proj}, y_{proj}, z_{proj}, \xi_{proj}, \eta_{proj}, \zeta_{proj}, zoom_{proj}, \ldots x_{sensor,i}, y_{sensor,i}, z_{sensor,i}) \quad (1)$$

This function can be used as a basis on which to compute an approximation of the exact values for the parameters of projector and screen. The computation may be done using the least square method, in that an error function is found $$Err_i = (f(\ldots, x_{sensor,i}, y_{sensor,i}, z_{sensor,i}) - (x_i, y_i))^2 \quad (2)$$

The error function is found by comparing computed and measured positions of each sensor. The sum of the error function $$E(x_{proj}, y_{proj}, z_{proj}, \xi_{proj}, \eta_{proj}, \zeta_{proj}, zoom_{proj}, \ldots) = \sum_i Err_i(\ldots) \quad (3)$$

is sought to be minimised by solving the equation set below for each of the parameters in E( ).

$$\frac{\partial E}{\partial x_{proj}} = 0 \quad (4)$$
$$\frac{\partial E}{\partial y_{proj}} = 0 \text{ etc} \ldots$$

The solution to the equation set gives a set of new parameters for the projector's position, which can subsequently be used in the model.

In the example an error function is used that is based on deviations between measured and computed coordinates represented in the projectors' image coordinates. As an alternative which may give better results, it is possible to use, for example, an error function that is based on deviations in physical position (x, y) or (x, y, z) within the projection theatre, optionally deviations in angles seen from eye point.

Tests involving the measurement of position on a screen indicate that some parameters are strongly connected and/or extremely sensitive to measuring noise. By way of example, mention may be made of the connection between zoom and the distance of the projector from the screen, which cannot be separated when projecting on a flat screen, and which may only be separated slightly when projecting on a curved screen. Within the scope of the invention, and having regard to the equipment used for the installation in question, it may in certain cases be advantageous to introduce limitations and/or weighting of these parameters to ensure a good result. It may also be necessary to allow some parameters to be kept constant in the solution of the equation set and/or allow some parameters to be weighted differently.

After an optimal adjustment of the projector position and orientation has been determined, the new position can be used for theoretical computation of necessary compensation for geometry and edge blending. Since the projection theatre, optics and measurements are not ideal, there will still be some residual errors which lead to the result not being perfect. I.e., $Err_i$ is >0 for some measuring points. This residual error can be compensated by using an extra correction, where residual error is known for each measured detection point/"sensor" $(x_i, y_i)$.

For each measuring point the extra correction (displacement of geometry) that is to be added is $$\Delta_i = (x_i - \tilde{x}_i, y_i - \tilde{y}_i) \quad (5)$$

Linear or second order interpolation is used between the measuring points.

FIG. 6 shows two juxtaposed projectors 21; 24 which project respective images 47; 48 towards a common display screen 49 to give a composite image. In addition, a plurality of light detection points 50-64 are shown. It will be seen that the two images 47, 48 have an overlapping area 65. In this area, the image pixels which appear are basically the same from each image, where these hit the screen 49. To prevent the brightness in this area from being too great, a per se known edge blending must be made in the area.

However, it will be seen that the light detection points 56, 57 and 58 are in this common edge area 65. These light detection points can, inter alia, be used to compare and adjust the adjacent images relative to each other with regard to image edge intensity and image pixels which represent corresponding picture elements in the composite image, so that there will be an exact overlapping. In this way, the adjacent, calibrated projector's parameters are also determined in relation to the display screen's respective detection points. Although it might be ideal to use, for example, two or more common light detection points in the edge area 65, satisfactory results will also be obtainable using just one detection point in the area.

In order that a later human visual check can be made to see that the image geometry seems to be correct, it is possible in a final image or sequence of images to introduce point references into the image and see that these correspond with the detection points. In order to accomplish this, at least a majority of the detection points must be equipped with a light emitter, see 9'; 10'; 11'; 13'; 16' in FIG. 5, to visually view an adjusted test image after a completed calibration operation.

The use of a plurality of light detection points 4-8; 50-64 spread across the screen 3; 49 permits correlation of brightness and/or colours in the projected image by comparing measurements at the detection points, and on the basis of the comparisons adjusting related projecting parameters in the corresponding projector.

It is also conceivable that the light detection points can be used for calibration of colour and light between projectors and/or within each image. Colour similarity and light quantity between projectors is a known problem which must also be taken into account during the construction of a projection theatre, and it is therefore obvious to consider this. To be able to perform a good colour and/or light calibration it may be necessary to have an accurate sensor connected to the individual detection point, and it may also be necessary to calibrate such sensors in relation to each other after calibration of the position of the detection points. If the screen is to be surface-treated, e.g., painted, after calibration of position, image geometry, brightness and colour or colour combination, it will hardly be possible to make accurate measurements afterwards. In such a case, surface-located detection points will have to be considered.

Figure 8:
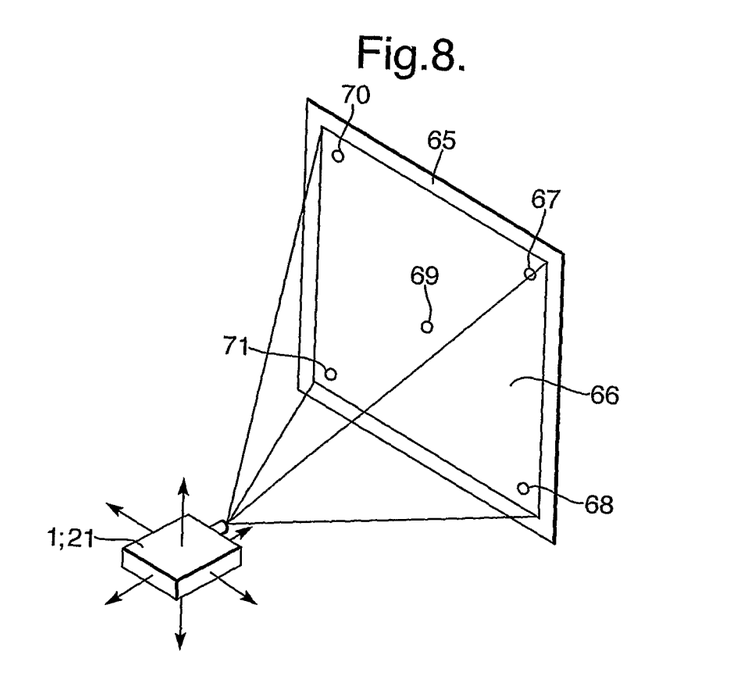
FIG. 8 illustrates the possibility of mechanical adjustment of the projector position and/or orientation based on measured deviations.

FIG. 8 illustrates mechanical or electromechanical adjustment of the position and/or orientation of a projector 1; 21; 24 in relation to a display screen 65 based on measured deviations. It can be predetermined which image pixels in the projected image 66 are to hit the individual detection points 67-71 on the screen. The use of the detection points in this way will thus cause the corners of the projected image to come into the right place in that the projector is adjusted as regards lateral position, vertical position relative to the screen 65, and distance from the screen 65. In connection with this, the focus setting of the projector, for example, may also be adjusted. Strictly speaking, in this case the detection point 69 will not be necessary, but can nevertheless be used to optimise the setting before other image corrections are made, as explained above.

The present invention thus distinguishes itself in many ways, but especially by its simplicity, and it can be used for at least one of: adjustment of the image geometry of the image; adjustment of projection distortions in the image; adjustment of the edge areas of the image relative to the edges of the display screen; adjustment of edge transition or transitions to at least one adjacent projected image on the display screen; correction of colours in the image; correction of brightness in the image.

Figure 9:
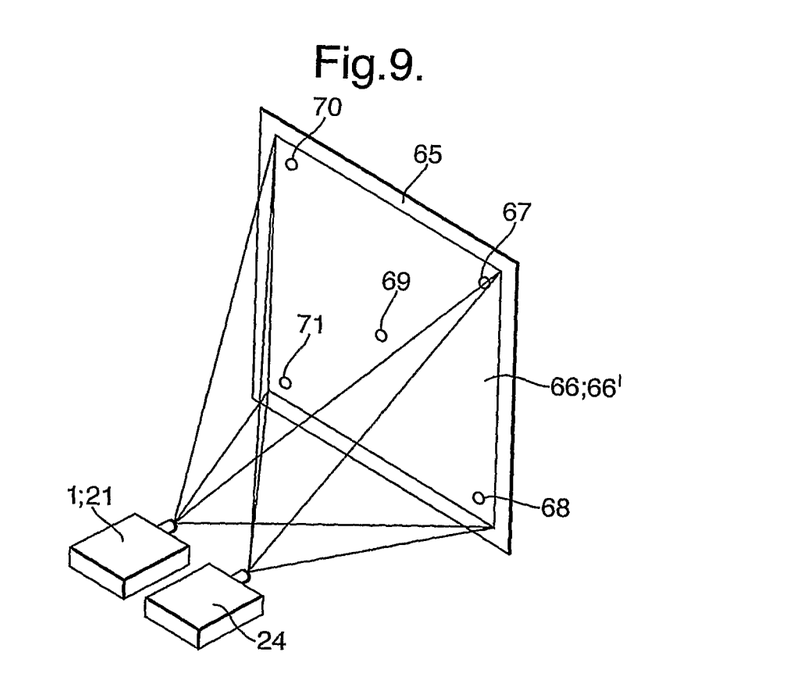
FIG. 9 indicates aspects of the invention where two projectors are to be adjustable to cover the same screen area.

FIG. 9 outlines a solution where two projectors 1; 21 and 24 are to be adjustable to cover the same area on the display screen 65. In such a case, it is important that the images 66, 66' that shown on the screen 65 projected by the respective projector appear as far as possible as identical, so that overlapping identical images will appear as identical, or that alternation between the displays of the two projectors will not disturb the visual impression. This means that at the detection points 67-71 the same image pixels appear in the same images. To deal with the projection distortions that must be compensated by adjustments, more detection points may optionally be used on the screen than the five that are shown as an example. However, the adjustment methodology is in any case the same as shown and explained above in the description of the invention. The solution that is shown in connection with FIG. 9 could be used where there is a need for redundancy or stand-by solution, i.e., that, for example, the projector 24 takes over the function of the projector 1; 21 if the last-mentioned has a malfunction. In some cases, the use maybe in connection with a doubling of brightness, i.e., that both projectors are switched on at the same time and show the same image or that one of the projectors shows an image that gradually fades in, whilst the other projector shows an image that gradually fades out and vice versa. In other cases, the use may be related to forming "stereo-vision" or 3-dimensional vision, where the projectors have light filters mounted thereon, for example, colour filters or polarisation filters, and where the viewer of the screen 65 wears glasses which correspond to the projectors' light filters. A further utilisation may be related to the use of the screen for two different purposes where it is advantageous or expedient to use separate projectors, for example, on one and the same display screen, a video display from one projector combined with computer graphics from the second projector. Of course, other uses for providing special effects are also conceivable.

The invention claimed is:

1. A method for use in calibrating a projector image display towards a display screen, comprising,
   a) providing the display screen with a plurality of discrete light detection points that are located on or in the display screen to represent and act as sensing points of the display screen to sense light on the display screen,
   b) projecting at least one image towards the display screen,
   c) arranging each light detection point or groups thereof to be associated with and physically connected to a light detector;
and wherein the method further comprises one of:
   d) measuring and determining the image pixel or pixels of the projected image which hit the respective detection point on the screen,
   e) physically shifting the projector by adjusting the physical position of the projector with respect to at least one of: lateral direction, vertical direction, orientation and distance to the screen, by simultaneously correlating measured image pixel information at the detection points with theoretical image pixel information for these detection points until the measurement deviation has been minimised as a consequence of said adjustment; and subsequently fixing the position of the projector; and f) correlating brightness and/or colours in the projected image by comparing measurements at the detection points; and adjusting relevant projection parameters or image parameters correspondingly.

2. The method of claim 1, wherein relevant image parameters or projector parameters are adjusted so that a desired image pixel or desired image pixels hit a respective detection point.

3. The method of claim 1 further comprising:
delivering image adjustment parameters to an image signal processor for storage of adjusted images on a storage medium, said storage medium being adapted to subsequently deliver to the projector adjusted image information for display.

4. The method of claim 1, further comprising:
at least once carrying out the following steps:
   e) delivering signals from the detection points to a signal processing unit;
   f) receiving in the signal processing unit image signals from a source;
   g) adjusting the received image signals; and
   h) delivering the adjusted image signals to the projector.

5. The method of claim 1, further comprising:
at least once carrying out the following steps:
   i) delivering signals from the detection points to an image source;
   j) adjusting the image signals in the image source by using the detection point signals; and
   k) delivering the adjusted image signals to the projector.

6. The method as disclosed in claim 1, wherein
there is successively projected on the screen wholly or partly different or changing images, and wherein at least one dedicated test image is one of the images.

7. The method as disclosed in claim 1, wherein
said projected test image appears as a sectioned or divided image on the display screen, and that the position of the respective detection point is defined with relation to the x, y position or group of x, y positions in the sectioned image.

8. The method as disclosed in claim 1 wherein
at least two successive image measurements cause the detected image pixel or pixels to define respective image pixel coding so that the position of each detection point is associated with at least one pixel address, and wherein the coding appears as a binary code or coding is analogue and is related to analogue parameters such as brightness or colour in a detected image pixel or detected image pixels.

9. The method as disclosed in claim 1, wherein
a detection point is caused to be hit wholly or partly by two or more image pixels, and that a centre of mass computation of the detected image pixels is carried out to compute the position of the detection point in relation to the image pixels' hit on the display screen and/or to adjust the image pixels with respect to at least one of the following parameters: brightness, colour and overall colour.

10. The method as disclosed in claim 1, wherein
for the adjustment of convergence of a plurality of primary colours emitted from a projector, for example, of the laser projector type or the cathode ray tube type, the brightness of the individual colours is measured at at least one detection point.

11. The method as disclosed in claim 1, further comprising:
computing the expected position of the individual detection points based on the parameters of a theoretical model which at least include the x, y, z parameters of the projector and the x, y or x, y, z parameters of the detection points in relation to the position and orientation of the projector;
seeking and finding the position of the projector in relation to the theoretical model based on the measured position of the detection points; and
causing deviations in the computation to be minimised in order to define the position of the projector in relation to the individual detection points.

12. The method as disclosed in claim 1, further comprising
constructing a catalogue of measurement deviations associated with each detection point; and
introducing a correction parameter that is specific to each detection point so as to cause shifting of desired at least one picture element or image pixel to as close to said detection point as possible.

13. The method of claim 1, wherein the method further comprises;
correlating brightness and/or colours in the projected image by comparing measurements at the detection points, and by adjusting related projection parameters in the projector or image parameters correspondingly.

14. The method as disclosed in claim 10,
wherein the centre of mass computation is used to cause optimal focussing towards the display screen of the test image projected from the projector.

15. The method as disclosed in claim 1, wherein the projector cooperates with at least one simultaneously operative juxtaposed projector for projecting a composite image on the display screen,
wherein the parameters of the adjacent projectors in relation to the respective detection points of the display screen are compared and adjusted in relation to each other with respect to image intensity and image pixels that represent corresponding picture elements in the composite image;
wherein the composite image is allowed to consist of two wholly or partly overlapping images;
wherein the position of corresponding picture elements are compared in an overlapping area formed by the images projected from the respective projector by detection at at least one detection point in the overlapping area; and
wherein the image parameters in the images from the respective projector are adjusted to give the images identical or almost identical pixel positions in the overlapping area which forms the composite image.

16. The method as disclosed in claim 1, wherein the projector is intended to substitute or be substituted by at least one juxtaposed projector for providing substitute image display on the display screen,
wherein the parameters of the adjacent projectors in relation to the respective detection points of the display screen are compared and adjusted relative to each other with respect to image intensity and image pixels that represent corresponding picture elements in the display area in question;
wherein the position of corresponding picture elements in the display area formed by the images projected from the respective projector are compared by detection at at least one detection point in the display area; and
wherein the image parameters in the images from the respective projector are adjusted to give the images identical or almost identical pixel positions in the display area.

17. The method as disclosed in claim 1 wherein the projector cooperates with at least one juxtaposed projector for projecting a composite image on the display screen, wherein the parameters of the adjacent, calibrated projectors are compared and adjusted in relation to the respective detection points of the display screen relative to each other with respect to image edge intensity and image pixels that represent corresponding picture elements in the composite image;

wherein the position of corresponding picture elements in the display area formed by the images projected from the respective projector by detection are compared at at least one detection point in the display area that is the same for respective images; and wherein the parameters of the projectors are adjusted in relation to each other with respect to image edge intensity and image pixels that represent said corresponding picture elements in the composite image.

18. The method as disclosed in claim 1, wherein visually viewing of an adjusted test image after a completed calibration operation is enabled by using at least a majority of the detection points which are equipped with a light emitter.

19. A device for use in calibrating a projector image display towards a display screen, wherein the display screen is provided with a plurality of discrete light detection points, wherein a) each light detection point or groups of light detection points are located on or in the display screen to represent and act as sensing points of the screen to sense light on the display screen and are associated with and physically connected to a light detector; and wherein the device further comprises one of:

b) the light detector or detectors and a projector are connected to at least one processor, or that the light detector or detectors are connected to the projector's processor; and the processor or processors being arranged to determine which image pixel or pixels of the projected image hit the respective detection point on the screen;

c) at least three of these light detection points being positioned close to the edges or corners of the display screen, a projector being adapted to project at least one image towards the display screen, and the projector being physically shiftable in order to adjust its physical position with respect to at least one of: lateral direction, vertical direction, orientation and distance to the screen; and a correlating means being associated with the light detection points and the projector to correlate measured image pixel information in the detection points with theoretical image pixel information for these detection points until the measurement deviation has been minimised as a result of said adjustment and subsequent fixing; and d) the light detector or detectors and a projector are connected to at least one processor, or that the light detector or detectors are connected to the projector's processor; and the processor or processors being adapted to correlate brightness and/or colours in the projected image by comparing measurements at the detection points, and adjusting relevant projector parameters correspondingly.

20. The device as disclosed in claim 19, wherein
the processor or processors are adapted to adjust relevant image parameters or projector parameters, so that a desired image pixel or pixels hit a respective detection point.

21. The device as disclosed in claim 19, wherein
the device comprises a storage medium for storing adjusted images, said storage medium being adapted to subsequently deliver to the projector adjusted image information for display.

22. The device as disclosed in claim 19,
wherein the detection points are connected to a signal processing unit;
wherein the signal processing unit, on an input side, is connected to an image signal source, the signal processing unit being adapted to adjust the received image signals; and
wherein the signal processing unit has an output for delivering adjusted image signals to the projector.

23. The device as disclosed in claim 19,
wherein the detection points deliver image signals to an image source;
wherein the image source is adapted to adjust the image signals by using the detection point signals; and
wherein the image source output is connected to the projector to deliver the adjusted image signals to the projector.

24. The device as disclosed in claim 19, wherein said discrete light detection points are located immediately below the front surface of the display screen, or at a distance from, on or in the front surface of the screen.

25. The device as disclosed in claim 19, wherein the front surface of the screen is provided with a partially translucent cover layer which covers said discrete light detection points, and wherein said cover layer is formed of at least one layer of paint, a sheet, a foil or a film.

26. The device as disclosed in claim 19, wherein groups of light detection points are associated with a light detector.

27. The device as disclosed in claim 19, wherein
the processor or processors are adapted to give the position of each detection point at least one pixel address, at least two successive image measurements causing the detected image pixel or pixels to define respective pixel coding, said coding is a binary code or is analogue and is related to analogue parameters such as brightness or colour in a detected image pixel or detected image pixels.

28. The device as disclosed in claim 19,
wherein the processor or processors being adapted to make a centre of mass computation of the detected image pixels when the detection point is hit wholly or partly by two or more image pixels in order to compute the position of the detection point in relation to the image pixels' hit on the display screen and/or to adjust the projected image pixels with respect to at least one of the following parameters: brightness, colour and overall colour, and wherein the centre of mass computation carried out by the processor or processors is a function of the brightness and/or colour and/or overall colour of the image pixels.

29. The device as disclosed in claim 19,
wherein the processor or processors being adapted to make an adjustment of convergence of a plurality of primary colours emitted from a projector, for example, of the laser projector type or the cathode ray tube type, based on measurement of the brightness of the individual colours at at least one detection point.

30. The device as disclosed in claim 19,
wherein the processor or processors, on the basis of the parameters of a theoretical model which at least include the x, y, z parameters of the projector and the x, y or x, y, z parameters of the detection points in relation to the position and orientation of the projector, being adapted to compute the expected position of the individual detection points;
wherein the processor or processors, on the basis of the measured position of the detection. points, being adapted to seek and find the position of the projector in relation to the theoretical model; and wherein the processor or processors being adapted to minimise deviations in the computation in order to define the position of the projector in relation to the individual detection points on the display screen.

31. The device as disclosed in claim 19, wherein the processor or processors being adapted to construct a catalogue of measurement deviations associated with each detection point, and to introduce a correction parameter that is specific to each detection point so as to cause shifting of desired at least one picture element or image pixel to as close to said detection point as possible.

32. The device as disclosed in claim 19, wherein the processor or processors contain a correlator that is adapted to correlate brightness and/or colours in the projected image by comparing measurements at the detection points, and where the output signals from the correlator cause an adjustment of related projection parameters in the projector or image parameters.

33. The device as disclosed in claim 19, wherein each detection point is associated with a respective discrete light sensor, or all the detection points or groups of detection points are associated with a common light sensor via optical fibres, and wherein the light sensor or sensors and the projector are connected to or communicate with a common processor, or the light sensor or sensors are directly connected to the projector's processor.

34. The device as disclosed in claim 19, wherein the projector is adapted to cooperate with at least one simultaneously operative, juxtaposed projector for projecting a composite image on the display screen, the composite image consisting of two wholly or partly overlapping images;

wherein an image processing device is arranged to compare the parameters of the adjacent projectors in relation to the respective detection points of the display screen, and to adjust the images relative to each other with respect to image intensity and image pixels that represent corresponding picture elements in the composite image;

wherein a signal processor is adapted to compare the position of corresponding picture elements in an overlapping area formed by the images projected from the respective projector by detection at at least one detection point in the overlapping area; and wherein the image processing device causes an adjustment of the image parameters in the images from the respective projector to give the images identical or almost identical pixel positions in the overlapping area which forms the composite image.

35. The device as disclosed in claim 19, wherein the projector is intended to substitute or be substituted by at least one juxtaposed projector for providing substitute image display on the display screen, wherein the image processing device is arranged to compare the parameters of the adjacent projectors in relation to the respective detection points of the display screen and to adjust these parameters relative to each other with respect to image intensity and image pixels that represent corresponding picture elements in the display area in question;

wherein a signal processor is adapted to compare the position of corresponding picture elements in the display area formed by the images projected from the respective projector by detection at at least one detection point in said display area; and wherein the image processing unit is adapted to adjust the image parameters in the images from the respective projector to give the images identical or almost identical pixel positions in the display area.

36. The device as disclosed in claim 19, wherein the projector cooperates with at least one juxtaposed projector for projecting a composite image on the display screen, wherein in the overlapping area between at least two images which form a composite image there is placed at least one detection point which is common to said at least two images; and wherein the processor or processors being adapted to compare the parameters of the adjacent projectors in relation to the respective detection points of the display screen and adjust these parameters relative to each other with respect to image edge intensity and image pixels that represent identical picture elements in the composite image.

37. The device as disclosed in claim 19, wherein at least a majority of the detection points are equipped with a light emitter in order to visually view an adjusted test image after a completed calibration operation.

38. A display screen for displaying an image projected from at least one projector and for calibrating image geometry and brightness, comprising a plurality of discrete light detection points provided on or in the front surface of the screen to represent and act as sensing points of the screen to sense light on the display screen;

each light detection point or groups thereof being associated with and physically connected to a light detector, and wherein the display screen further comprises at least one of:

the light detector or the light detectors being connected to at least one image signal processor, and the image signal processor or processors are arranged to determine which image pixel or pixels of the projected image hit the respective detection point on the display screen;

the light detector or the light detectors being connected to at least one image signal processor, and the image signal processor or processors being adapted to correlate brightness and/or colors in the projected image by comparing measurements at the detection points of the image pixel or pixels of the projected image which hit the respective detection point on the screen, and adjusting relevant projector parameters correspondingly.

39. The display screen as disclosed in claim 38, wherein each tight detection point is associated with a respective discrete light sensor, or all the detection points or groups of detection points are associated with a common light sensor via optical fibres, and wherein the light sensor or sensors and the projector are connected to or communicate with a common processor, or that the light sensor or sensors are directly connected to the projector's processor.

40. The display screen as disclosed in claim 38, wherein in the overlapping area between at least two images projected from at least two respective, juxtaposed projectors, and where these images form a composite image, there is placed a least one detection point that is common to said at least two images, which detection points are adapted for use, by a connected processor, to compare parameters of the adjacent, calibrated projectors in relation to the respective detection points of the display screen and adjust these parameters in relation to each other with respect to image edge intensity and image pixels that represent identical detected picture elements in the composite image.

41. The display screen as disclosed in claim 38,
wherein at least a majority of the detection points are equipped with a light emitter in order to visually view an adjusted test image after a completed calibration operation.

42. The display screen as disclosed in claim 38,
wherein the light detection points are selectable from the group consisting of:
discrete light sensors adhesible to the front surface of the display screen or attachable to the display screen individually or in groups;
discrete light sensors that communicate with respective light guides extending from the rear of the screen towards the front thereof;
discrete light sensors that communicate with respective light guides extending from the rear of the screen towards the front thereof and are covered there by a partially translucent cover layer on the front surface of the screen;
optical fibres that extend from the rear of the screen towards the front thereof and are covered there by a partially translucent cover layer on the front surface of the screen, and where the optical fibres are associated with a respective light sensor or a group of optical fibres is associated with a common light sensor;
discrete light sensors located immediately below the front surface of the screen and covered by a partially translucent cover layer on the front surface of the screen;
optical fibres which extend from the front of the screen backwards through the screen to a common light sensor; and
light sensors suspended on or in front of the screen at a distance from its front surface.

43. The display screen as disclosed in claim 42, wherein said cover layer covers the whole of the screen's front surface in addition to said discrete the light detection points.

44. The display screen as disclosed in claim 38, wherein the light detection points, when an image is projected against the rear of the display screen, consist of
discrete light sensors adhesible to the front surface of the display screen or attachable to the display screen individually or in groups; and
light sensors suspended on or in front of the screen at a distance from its front surface.

45. The display screen as disclosed in claim 44, wherein the display screen is partially translucent, or the display screen has a cover layer that covers the front surface of the screen, and where the cover layer is constituted of at least one layer of paint, a sheet, foil or film.

46. A device for use in calibrating a projector image display towards a display screen, comprising,
a) a display screen
b) a plurality of discrete light detection points provided on or in the display screen to represent and act as sensing points on the display screen, to sense light on the display screen
c) each said light detection point or selected groups of said light detection points being associated with and physically connected to a separate light detector; and wherein the device further comprises one of:
d) at least two projectors including a first projector for projecting a first image display toward the display screen, the first projector including a first processor, the light detector or detectors and the first projector being connected to the first projector's first processor or at least one other processor, and the first projector processor by itself or with the one other processor are arranged to determine which image pixel or pixels of the projected first image hit the respective light detection point on the screen;
e) the display screen having edges and corners and at least three of the light detection points being positioned close to the edges or corners of the display screen, and the first projector being physically shiftable in order to adjust its physical position with respect to at least one of: lateral direction, vertical direction, orientation and distance to the screen; and a correlating means being associated with the light detection points and the projector to correlate measured image pixel information in the detection points with theoretical image pixel information for these detection points until the measurement deviation has been minimised as a result of said adjustment and subsequent fixing; and
f) a second projector for projecting a second image display toward the display screen, the second projector including a second processor, the light detector or detectors and the second projector being connected to the second projector's second processor or at least the one other processor, and the second projector's second processor by itself or with the one other processor have means to correlate brightness and/or colours in the projected image by comparing measurements at the detection points, and means for adjusting relevant projector parameters correspondingly.

47. A device for use in calibrating at least two projectors towards a display screen, comprising,
a) a display screen provided with a plurality of discrete light detection points, wherein each light detection point or groups of light detection points are located on or in the display screen to represent and act as sensing points of the display screen to sense light on the display screen and are associated with and physically connected to alight detector,
b) a first projector for projecting a first image towards an area of the display screen with at least one light detection point,
c) at least a second projector for projecting at least a second image towards an area of the display screen with at least one light detection point wherein the projectors are calibrated by comparing measurements at the detection points, and on the basis of the comparisons adjusting related projecting parameters in the corresponding projectors.

48. The device of claim 47, wherein the comparisons are done by measurements of the positions of the pixel in light detection points on the display screen.

49. The device of claim 48, wherein the comparisons are done by measurements of the brightness and/or colours in light detection points.

* * * * *